No. 773,274. PATENTED OCT. 25, 1904.
R. C. M. BOWLES.
STETHOSCOPIC INSTRUMENT.
APPLICATION FILED APR. 9, 1904.
NO MODEL.

Witnesses.
C. H. Garnett
J. Murphy.

Inventor:
Robert C. M. Bowles
by Jas. H. Churchill
atty.

No. 773,274. Patented October 25, 1904.

UNITED STATES PATENT OFFICE.

ROBERT C. M. BOWLES, OF BROOKLINE, MASSACHUSETTS.

STETHOSCOPIC INSTRUMENT.

SPECIFICATION forming part of Letters Patent No. 773,274, dated October 25, 1904.

Application filed April 9, 1904. Serial No. 202,332. (No model.)

*To all whom it may concern:*

Be it known that I, ROBERT C. M. BOWLES, a citizen of the United States, residing in Brookline, in the county of Norfolk and State of Massachusetts, have invented an Improvement in Stethoscopic Instruments, of which the following description, in connection with the accompanying drawings, is a specification, like letters on the drawings representing like parts.

This invention relates to a stethoscopic instrument of the class shown and described in United States Patent No. 677,172, granted to me June 25, 1901.

Instruments of the class referred to are provided with diaphragms which are circular in form and which are designed to make contact with the body of the patent being examined. The diaphragms referred to are usually made of two sizes, one of two and one-quarter inches in diameter and the other of an inch and a quarter in diameter, both sizes of instruments having their own special functions, the larger one being used when a substantially large area is being examined and the smaller being used when it is desired to examine smaller areas—such, for instance, as the apices over the clavicles, intercostals, and like parts of the body, where the larger instrument cannot be used to advantage owing to size of the instrument, and the small instrument being not wholly satisfactory on account of its decreased vibratory surface.

The present invention has for its object to provide an instrument of the class referred to with which may be obtained the maximum vibration of the larger instrument with the adaptability of the smaller instrument. To this end I provide an instrument having a diaphragm which is non-circular in shape or form and of a sufficient length to obtain the maximum vibration and sufficiently narrow in parts to obtain the adaptability desired and with which the volume of sound can be changed at the will of the operator according to the extent of contact with the body.

Figure 1:
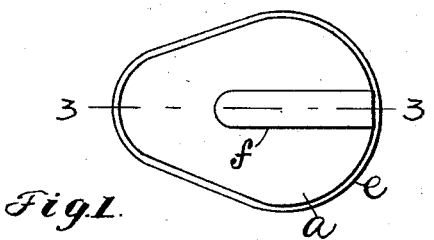
Figure 4:
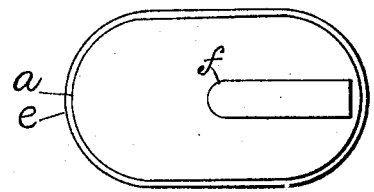
Figure 2:
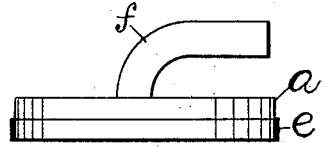
Figure 5:
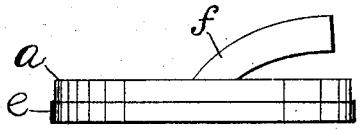
Figure 3:
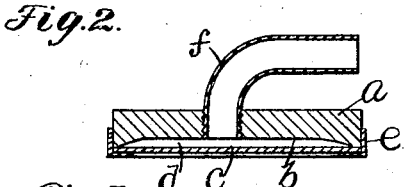

Figure 1 is a plan view of one form of instrument embodying this invention; Fig. 2, a side elevation of the instrument shown in Fig. 1; Fig. 3, a section on the line 3 3, Fig. 1; Fig. 4, a plan of another form of instrument embodying the invention; Fig. 5, a side elevation of the instrument shown in Fig. 4, and Fig 6 a plan of still another form of instrument embodying the invention.

The instrument herein shown as embodying this invention comprises a body portion $a$, preferably of metal and provided with a recess or cavity $b$ in its front face, with which coöperates a diaphragm $c$, preferably of nonmetallic material, such as hard rubber, which forms a chamber $d$ and is secured to the body $a$ by a ring $e$, which may be screwed or otherwise fastened to said body.

The chamber $d$ has communicating with it a sound-outlet tube $f$.

The body portion $a$ and its diaphragm $c$ are made non-circular in shape, so that a single instrument may be used with maximum efficiency for examining substantially large areas and also with equal efficiency for examining small areas. This result is accomplished by the non-circular form of the body portion of the diaphragm, for by reference to Fig. 1 it will be seen that a large area may be examined by placing the entire surface of the diaphragm in contact with the body of the patient, while small areas—such as the clavicle, apices, intercostals, &c.—may be examined by bringing the narrow part or end of the diaphragm in contact with the apex over the clavicle or other part of the body, and the vibration of the diaphragm produced thereby is sufficient to enable an efficient and satisfactory examination to be made.

Figure 6:
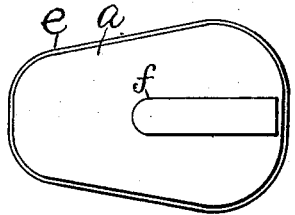

In Fig. 1 the instrument is shown as substantially pear-shaped in form; but other noncircular forms may be used equally as well—such, for instance, as in Fig. 4, wherein the instrument is represented as provided with parallel sides and curved ends, and in Fig. 6, wherein the instrument is shown as provided with converging sides and rounded ends, the inclination of the sides being more gradual than in Fig. 1.

Believing myself to be the first to produce an instrument of the character described with a diaphragm non-circular in shape, whereby an instrument is produced with which the vibration of a large instrument and the adaptability of a small instrument are obtained, I do not desire to limit my invention to the particular embodiments of the non-circular form of diaphragm herein shown.

I claim—

1. A stethoscope comprising a non-circular body portion provided with a sound-delivery opening, and a non-circular diaphragm adapted at the will of the operator to make contact with a limited or with an extended surface of the body of a patient and secured to said body portion to coöperate therewith and form an air-chamber, substantially as described.

2. In a stethoscope, a non-circular diaphragm adapted at the will of the operator to make contact with a limited or with an extended surface of the body of a patient, substantially as described.

In testimony whereof I have signed my name to this specification in the presence of two subscribing witnesses.

ROBERT C. M. BOWLES.

Witnesses:
 JAS. H. CHURCHILL,
 J. MURPHY.